United States Patent
Uchida (10) Patent No.: US 7,614,651 B2
(45) Date of Patent: Nov. 10, 2009

(54) MOTOR VEHICLE CAPABLE OF PREVENTING MALFUNCTION AND INTERRUPTING HIGH-VOLTAGE SYSTEM WHEN ACCIDENT OCCURS

(75) Inventor: Kenji Uchida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 322 days.

(21) Appl. No.: 10/586,790

(22) PCT Filed: May 26, 2005

(86) PCT No.: PCT/JP2005/010106

§ 371 (c)(1),
(2), (4) Date: Jul. 20, 2006

(87) PCT Pub. No.: WO2006/022061

PCT Pub. Date: Mar. 2, 2006

(65) Prior Publication Data

US 2007/0152432 A1    Jul. 5, 2007

(30) Foreign Application Priority Data

Aug. 27, 2004  (JP)  ............................. 2004-248800

(51) Int. Cl.
    *B60R 21/01*  (2006.01)
(52) U.S. Cl. .................. 280/735; 180/274; 701/45; 307/10.1
(58) Field of Classification Search ............... 280/735; 180/274, 282, 285, 279; 701/45; 307/10.1
See application file for complete search history.

(56) References Cited

U.S. PATENT DOCUMENTS

| | | | |
|---|---|---|---|
| 5,725,399 A | | 3/1998 | Albiez et al. |
| 5,818,122 A | | 10/1998 | Miyazawa et al. |
| 5,995,891 A | * | 11/1999 | Mayumi et al. ............... 701/45 |
| 6,185,488 B1 | * | 2/2001 | Nomoto ...................... 701/29 |
| 6,189,923 B1 | | 2/2001 | Tsubone |
| 6,196,578 B1 | | 3/2001 | Iyoda |
| 6,848,713 B2 | * | 2/2005 | Nakashima et al. ......... 280/741 |
| 2002/0195290 A1 | | 12/2002 | Hayakawa |
| 2007/0103001 A1 | * | 5/2007 | Chiozzi et al. ............. 307/10.1 |

FOREIGN PATENT DOCUMENTS

| | | |
|---|---|---|
| DE | 31 16 867 A1 | 11/1982 |
| DE | 44 02 994 A1 | 8/1995 |

(Continued)

*Primary Examiner*—Paul N. Dickson
*Assistant Examiner*—George D. Spisich
(74) *Attorney, Agent, or Firm*—Oliff & Berridge, PLC (57) ABSTRACT

An output of a semiconductor impact sensor contained in an air bag ECU is used to make determination in light of a criterion for interrupting a high-voltage power supply, which is different from a criterion for inflating an air bag so that the semiconductor impact sensor forms a redundant system along with a conventional safing sensor to prevent malfunction. Furthermore, an output of the semiconductor impact sensor contained in the air bag ECU is used to make determination for safing and output a safing signal thereby, so that a redundant system can be formed for a front impact sensor, a side impact sensor, and a rear impact sensor. Accordingly, malfunction can be prevented when tampering such as a strike with a hammer occurs.

7 Claims, 4 Drawing Sheets

FOREIGN PATENT DOCUMENTS

| | | |
|---|---|---|
| DE | 197 12 544 A1 | 11/1997 |
| JP | A-07-096815 | 4/1995 |
| JP | A-7-123504 | 5/1995 |
| JP | A-7-277132 | 10/1995 |
| JP | A-8-116602 | 5/1996 |
| JP | A-9-118198 | 5/1997 |
| JP | A-9-263193 | 10/1997 |
| JP | A 10-94101 | 4/1998 |
| JP | A-11-152010 | 6/1999 |
| JP | A-11-170963 | 6/1999 |
| JP | A-11-227555 | 8/1999 |
| JP | A 2002-354602 | 12/2002 |
| JP | A 2003-9303 | 1/2003 |
| JP | A 2004-159439 | 6/2004 |
| KR | 2001-0085394 A | 9/2001 |
| KR | 20-0288845 Y1 | 9/2002 |
| RU | 2208534 C1 | 7/2003 |
| SU | 1699833 A1 | 12/1991 |

* cited by examiner

MOTOR VEHICLE CAPABLE OF PREVENTING MALFUNCTION AND INTERRUPTING HIGH-VOLTAGE SYSTEM WHEN ACCIDENT OCCURS

TECHNICAL FIELD

The present invention relates to a motor vehicle, and, more particularly, to a motor vehicle having a high-voltage electric system.

BACKGROUND ART

In recent years, there have been developed an electric vehicle, a hybrid vehicle, and a fuel-cell vehicle, whose motor is driven by a power supply of much higher voltage to propel the vehicle when compared to a battery of approximately 12 volt mounted on a conventional motor vehicle. For each of these vehicles having a high-voltage electric system, it is necessary to quickly interrupt the high-voltage power supply system thereof to prevent vehicle fire and electric shock accident in the case of impact. When the high-voltage system is interrupted, however, it is impossible to move the vehicle, and thus malfunction should be avoided.

For example, Japanese Patent Laying-Open No. 2002-354602 discloses a technique of using an impact sensor provided for inflating an air bag to interrupt a high-voltage system when the impact sensor senses an impact.

However, there may be a case where the interruption of the high-voltage system based on an output of the air bag impact sensor for activating an air bag is insufficient. In other words, the air bag impact sensor is configured to inflate an air bag only when a seat belt alone can cause injury to a passenger because the cost incurred to repair an air bag, for example, is large when it is once activated.

Instead, a high-voltage power supply system is required to be interrupted when a high-voltage electric system contained in an engine room on the front or rear side of the vehicle may be damaged due to an impact. Accordingly, it is preferable to determine whether a high-voltage power supply system is interrupted based on a criterion different from that for inflating an air bag.

Alternatively, it may be possible to provide an impact sensor designed specifically for determining whether a high-voltage power supply system is interrupted. In this case, it is necessary to prevent a malfunction of the impact sensor in the case of tampering such as a strike with a hammer in the periphery thereof. As a preventive measure against a malfunction, it may be possible to adopt following criteria (1) and (2) to exclude the case where such tampering may occur.

(1) When a shift position is in a parking range or in a neutral range, a high-voltage is not transferred to generate driving force. Therefore, a determination as to whether the vehicle is damaged is not made.

(2) When the vehicle is at low speed, a determination as to whether the vehicle is damaged is not made.

However, when criteria such as (1) and (2) above are adopted, there may be a case where, although it is preferable to interrupt a high-voltage power supply system, the high-voltage power supply cannot be interrupted in the event of a passive accident, namely, an accident caused by being collided by another vehicle during a temporal stop, for example, or an accident caused by changing a shift position to a neutral range while driving.

As a preventive measure against tampering such as a strike against the vehicle with a hammer, it may be possible to adopt a redundant system for an impact sensing portion. However, an additional impact sensor is needed, which causes an increase in cost and requires a mounting space therefor. Accordingly, it is difficult to implement such a measure.

DISCLOSURE OF THE INVENTION

An object of the present invention is to provide a motor vehicle capable of preventing malfunction and interrupting a high-voltage power supply system when an accident occurs.

In brief, the present invention is a motor vehicle having an air bag, including an air bag ignition device, and a first control unit for detecting an impact against the vehicle and instructing the air bag ignition device to ignite. The first control unit includes a semiconductor impact sensor, and a first control portion for outputting a signal for interrupting a high-voltage power supply and a safing signal for interrupting a high-voltage power supply in response to an output of the semiconductor impact sensor. The motor vehicle further includes a high-voltage power supply, an interrupting portion for interrupting an output of the high-voltage power supply, and a second control unit for controlling the interrupting portion. The second control unit causes the interrupting portion to immediately interrupt the output of the high-voltage power supply when the signal for interrupting the high-voltage power supply is output, and causes the interrupting portion to interrupt the output of the high-voltage power supply when the safing signal for interrupting the high-voltage power supply is output and when a given criterion is satisfied.

Preferably, the first control unit further includes a safing sensor for sensing an impact independently of the semiconductor impact sensor. The first control portion outputs the signal for interrupting the high-voltage power supply when the safing sensor senses an impact and when the output of the semiconductor impact sensor satisfies a given criterion.

Preferably, the motor vehicle further includes an impact sensor for sensing an impact causing a breakage of the high-voltage power supply, independently of the semiconductor impact sensor. The second control unit includes a second control portion for causing the interrupting portion to interrupt the output of the high-voltage power supply when the safing signal for interrupting the high-voltage power supply is output and when the impact sensor senses an impact.

More preferably, the first control portion evaluates the output of the semiconductor impact sensor in light of a criterion corresponding to the impact sensor and outputs the safing signal for interrupting the high-voltage power supply.

Preferably, the first control unit further includes a safing sensor. The first control portion receives the output of the semiconductor impact sensor and determines whether or not the output meets a first criterion by which the air bag should be inflated, a second criterion by which a circuit related to the high-voltage power supply is assumed to be broken, and a third criterion by which a certain impact is assumed to occur although the first criterion is not satisfied. The first control portion outputs the signal for interrupting the high-voltage power supply when determining that the output meets the first criterion or the second criterion and when the safing sensor senses an impact, and outputs the safing signal for interrupting the high-voltage power supply when determining that the output meets the third criterion.

According to an another aspect of the present invention, the present invention is a motor vehicle having an air bag, including a high-voltage power supply, an interrupting portion for interrupting an output of the high-voltage power supply in response to a signal for interrupting the high-voltage power supply, an air bag ignition device, and a first control unit. The first control unit includes a semiconductor impact sensor for detecting an impact against the vehicle, a safing sensor for sensing an impact independently of the semiconductor impact sensor, and a first control portion for outputting to the air bag ignition device an instruction to ignite when the safing sensor senses an impact and when an output of the semiconductor impact sensor satisfies a given first criterion, and outputting the signal for interrupting the high-voltage power supply when the safing sensor senses an impact and when the output of the semiconductor impact sensor satisfies a given second criterion.

According to still another aspect of the present invention, the present invention is a motor vehicle having an air bag, including a high-voltage power supply, an interrupting portion for interrupting an output of the high-voltage power supply in response to a signal for determining interruption of the high-voltage power supply, an air bag ignition device, and a first control unit. The first control unit includes a semiconductor impact sensor for detecting an impact against the vehicle, a safing sensor for sensing an impact independently of the semiconductor impact sensor, and a first control portion for outputting to the air bag ignition device an instruction to ignite when the safing sensor senses an impact and when an output of the semiconductor impact sensor satisfies a given first criterion, and outputting a safing signal when the output of the semiconductor impact sensor satisfies a given second condition. The motor vehicle further includes an impact sensor for sensing an impact independently of the semiconductor impact sensor, and a second control unit for outputting the signal for determining interruption of the high-voltage power supply when the impact sensor senses an impact and when the safing signal is output.

Accordingly, a main effect of the present invention is that a high-voltage power supply can be interrupted without providing an additional new sensor when it is preferable to interrupt the high-voltage power supply and when an air bag is not required to inflate.

Another effect of the present invention is that malfunction that would interrupt the high-voltage power supply can be prevented when tampering such as a strike with a hammer occurs, The foregoing and other objects, features, aspects and advantages of the present invention will become more apparent from the following detailed description of the present invention when taken in conjunction with the accompanying drawings.

BEST MODES FOR CARRYING OUT THE INVENTION

An embodiment of the present invention will now be described in detail in reference to the drawings. The same or corresponding portions in the drawings are denoted by the same reference characters, and the description thereof will not be repeated.

Figure 1:
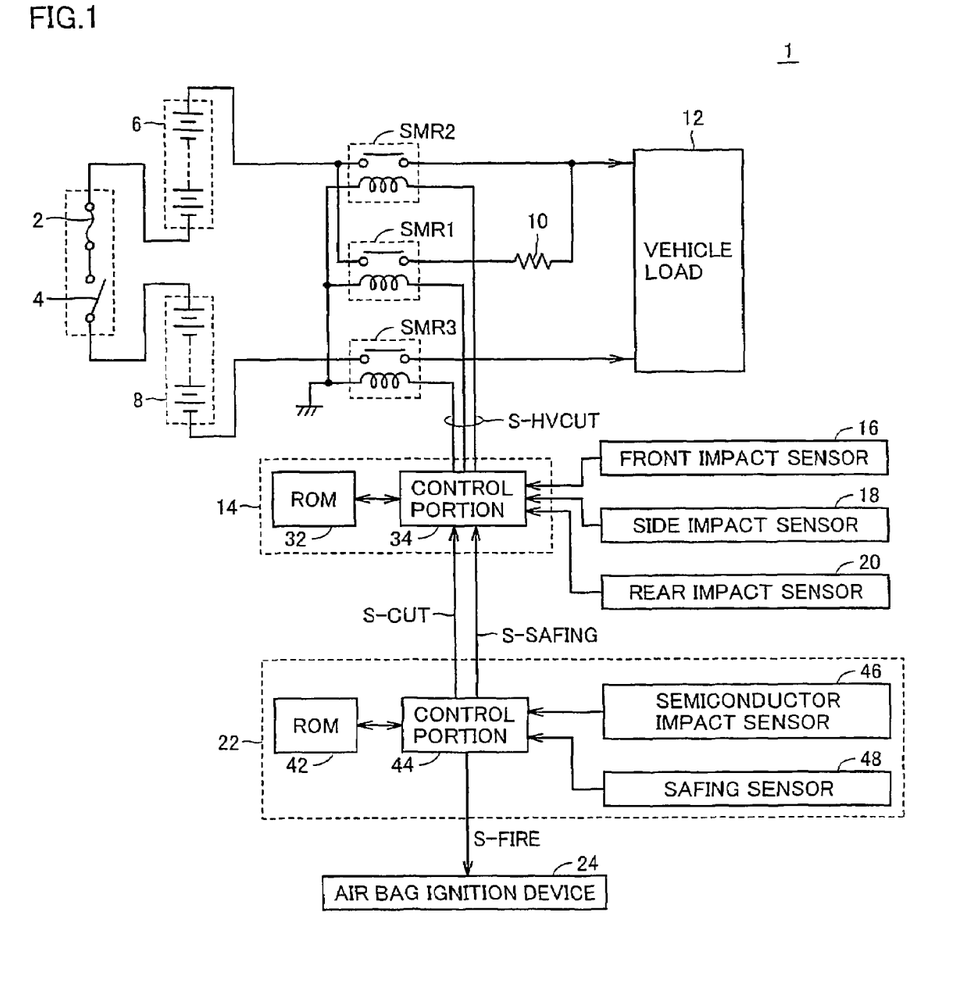
FIG. 1 is a circuit diagram for describing a high-voltage power supply system of a vehicle 1 according to the present invention.

FIG. 1 is a circuit diagram for describing a high-voltage power supply system of a motor vehicle 1 according to the present invention.

Referring to FIG. 1, motor vehicle 1 includes battery modules 6 and 8 connected in series, a fuse 2 and a service plug 4 provided on a path connecting battery modules 6 and 8 in series, a vehicle load 12 for receiving power from battery modules 6 and 8, and system main relays SMR 1-SMR 3 for making a power supply path from battery modules 6 and 8 to vehicle load 12 conductive or interrupted.

Battery modules 6 and 8 have a voltage higher than a conventional 12V battery, and have a configuration in which 14 battery modules each having 7.2V, for example, are connected in series. Service plug 4 detects that a high-voltage portion is exposed during maintenance, for example, and interrupts a current-flowing path to vehicle load 12.

System main relay SMR 2 is connected between a positive electrode of battery module 6 and vehicle load 12. System main relay SMR 1 is connected between the positive electrode of battery module 6 and vehicle load 12 via a resistor 10. System main relay SMR 3 is connected between a negative electrode of battery module 8 and vehicle load 12.

Motor vehicle 1 further includes an air bag ignition device 24 for igniting an air bag to activate the same, and an air bag ECU 22 for detecting an impact against the vehicle and outputting to air bag ignition device 24 an instruction to ignite.

Air bag ECU 22 includes a semiconductor impact sensor 46, a safing sensor 48 for detecting an impact independently of semiconductor impact sensor 46, a control portion 44 for instructing air bag ignition device 24 to ignite in response to an output of each of semiconductor impact sensor 46 and safing sensor 48 and outputting to a high-voltage supply control unit 14 an interrupting signal S-CUT and a safing signal S-SAFING, and a read-only memory (ROM) 42 for storing a program operating in control portion 44. Safing sensor 48 is a redundant sensor provided in case of erroneous sensing by semiconductor impact sensor 46. When the two sensors detect an impact simultaneously, air bag ignition device 24 is instructed to ignite the air bag. Read-only memory 42 is not limited to a ROM, and may be an erasable memory such as a flash memory.

Motor vehicle 1 further includes 3 sensors designed specifically for a hybrid vehicle for sensing an impact that may cause a breakage of a high-voltage system including vehicle load 12 and battery modules 6 and 8, namely, a front impact sensor 16, a side impact sensor 18, and a rear impact sensor 20.

Motor vehicle 1 further includes high-voltage supply control unit 14 for interrupting system main relays SMR 1-SMR 3 in response to interrupting signal S-CUT and safing signal S-SAFING provided by air bag ECU 22 and an output from each of front impact sensor 16, side impact sensor 18, and rear impact sensor 20. High-voltage supply control unit 14 outputs an interruption determining signal S-HVCUT so that system main relays SMR 1-SMR 3 are controlled to be made conductive or nonconductive.

High-voltage supply control unit 14 includes a control portion 34 for outputting interruption determining signal S-HVCUT to control the system main relays in response to an output from each of front impact sensor 16, side impact sensor 18, and rear impact sensor 20, and interrupting signal S-CUT and safing signal S-SAFING provided by control portion 44, and a read-only memory (ROM) 32 for storing a program operating in control portion 34. Read-only memory 32 may be an erasable memory such as a flash memory.

When high voltage is to be supplied to vehicle load 12, high-voltage supply control unit 14 initially makes system main relays SMR 1 and SMR 3 conductive, and then makes system main relay SMR 2 conductive, thereafter controls system main relay SMR 1 to be in a nonconductive state. By doing so, there flows control current initially passing through resistor 10, which protects vehicle load 12 from high-voltage rush current.

When power supply current is to be interrupted, initially system main relay SMR 2, and then system main relay SMR 3 are made nonconductive, and high-voltage supply control unit 14 checks whether system main relays SMR 2 and SMR 3 are reliably interrupted.

Figure 2:
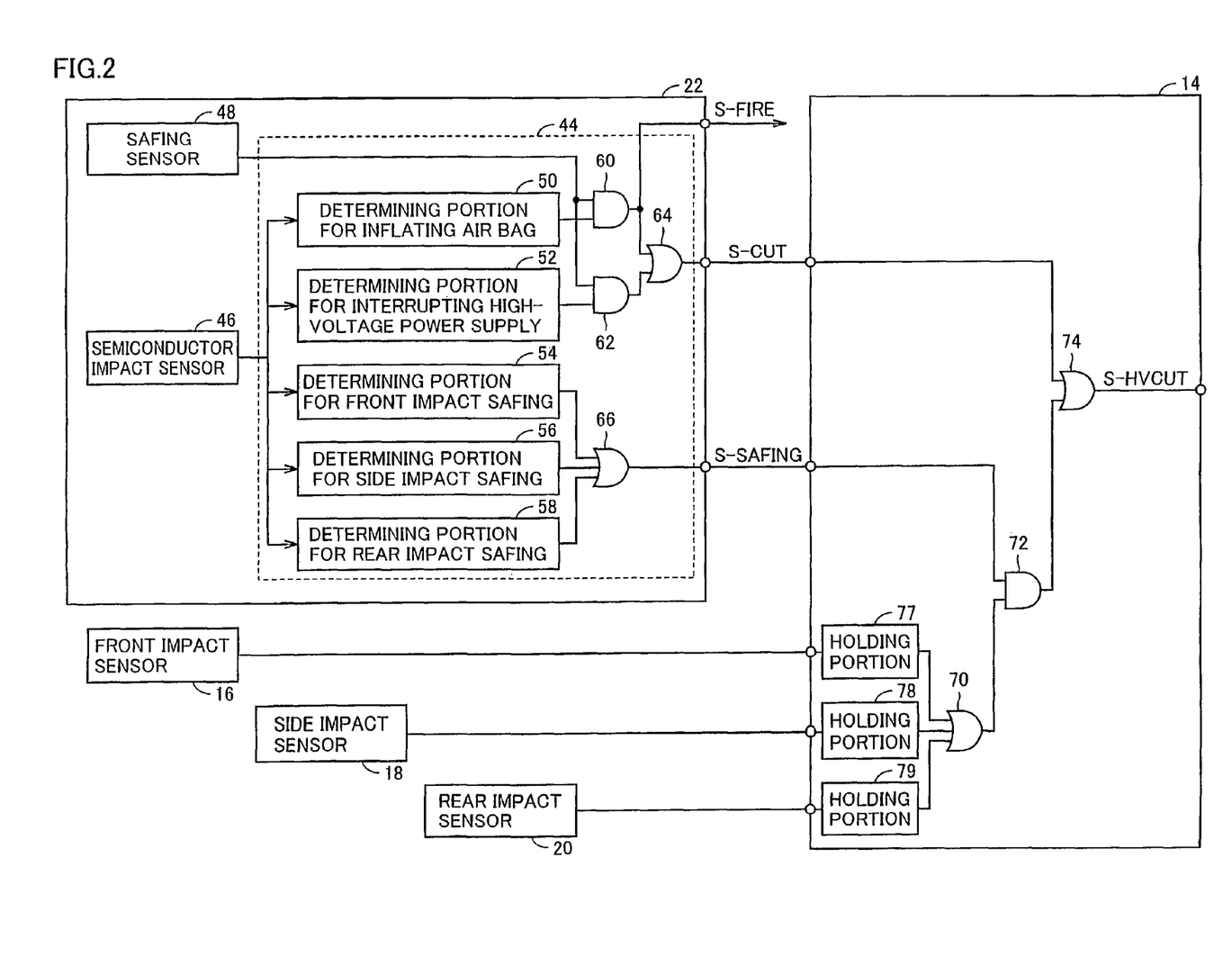
FIG. 2 is a block diagram for describing an air bag ECU 22 and a high-voltage supply control unit 14 in FIG. 1.

FIG. 2 is a block diagram for describing air bag ECU 22 and high-voltage supply control unit 14 in FIG. 1.

Referring to FIG. 2, air bag ECU 22 includes semiconductor impact sensor 46, safing sensor 48 for sensing an impact independently of semiconductor impact sensor 46, and control portion 44 for outputting interrupting signal S-CUT and safing signal S-SAFING in response to an output of each of safing sensor 48 and semiconductor impact sensor 46.

Interrupting signal S-CUT is a signal for instructing to immediately interrupt high voltage. Safing signal is a signal for indicating that a certain impact occurs although the air bag is not activated.

Control portion 44 includes a determining portion for evaluating an output of semiconductor impact sensor 46 in light of various criteria. More specifically, control portion 44 includes a determining portion 50 for inflating the air bag which determines to inflate the air bag if a passenger may be injured, a determining portion 52 for interrupting the high-voltage power supply which identifies an impact that may cause damage or exposure of the high-voltage power supply system, a determining portion 54 for front impact sating, a determining portion 56 for side impact sating, and a determining portion 58 for rear impact sating which determine that a certain impact occurs on front, lateral, and rear sides thereof, respectively, although the air bag does not inflate.

Control portion 44 further includes an AND logic portion 60 for receiving an output of each of safing sensor 48 and determining portion 50 for inflating the air bag, an AND logic portion 62 for receiving an output of each of safing sensor 48 and determining portion 52 for interrupting the high-voltage power supply, an OR logic portion 64 for receiving an output of each of AND logic portions 60 and 62, and outputting interrupting signal S-CUT, and an OR logic portion 66 for receiving an output of each of determining portion 54 for front impact sating, determining portion 56 for side impact safing, and determining portion 55 for rear impact sating, and outputting safing signal S-SAFING.

High-voltage supply control unit 14 includes holding portions 77, 78 and 79 for holding outputs of front impact sensor 16, side impact sensor 18, and rear impact sensor 20, respectively, for a given time period, an OR logic portion 70 for producing a logical sum of the outputs of holding portions 77, 78 and 79, an AND logic portion 72 for receiving sating signal S-SAFING and an output of OR logic portion 70, and an OR logic portion 74 for receiving an output of AND logic portion 72 and interrupting signal S-CUT to output interruption determining signal S-HVCUT for determining interruption of the high-voltage power supply system.

Since it takes approximately 1 second, for example, for air bag ECU 22 to evaluate an output of semiconductor impact sensor 46 to output sating signal S-SAFING, it is necessary to provide holding portions 77-79 so that the outputs of sensors 16, 18 and 20 are held therein, respectively, for a time period long enough to accommodate the above-described period (e.g. approximately 5 seconds).

Conventionally, a semiconductor impact sensor is provided in a redundant manner in addition to a sating sensor to prevent malfunction of the air bag system.

Firstly, the present invention prevents the high-voltage power supply system from being inadvertently interrupted by, in addition to preventing malfunction of the air bag in a conventional manner, applying a criterion for interrupting the high-voltage power supply that is independent of a criterion for inflating the air bag, and using safing sensor 48 as well.

Secondly, determining portions 54, 56 and 58 uses an output of semiconductor impact sensor 46 to sense that a certain impact occurs although the air bag does not inflate. Accordingly, air bag ECU 22 can serve as a safing sensor for impact sensors 16, 18 and 20.

Therefore, malfunction of impact sensors 16, 18 and 20 can be prevented when tampering such as a strike with a hammer occurs thereto.

An output of semiconductor impact sensor 46 is an acceleration that represents a value of impact energy. Fluctuation of the acceleration is compared to various criteria obtained from impact experiments in advance so that the output can also be used to make determination for interrupting the high-voltage power supply, and determine that a certain impact occurs, in addition to make determination for inflating the air bag.

To make determination for safing, types of impacts that actually activate a sensor designed specifically for a hybrid vehicle are identified by impact experiments, and outputs corresponding thereto are stored as a map in each of determining portions.

In other words, types of impacts that actually activate front impact sensor 16 are identified by impact experiments, and outputs of semiconductor impact sensor 46 corresponding thereto are stored as a map in determining portion 54 for front impact safing.

Furthermore, types of impacts that actually activate side impact sensor 18 are identified by impact experiments, and outputs of semiconductor impact sensor 46 corresponding thereto are stored as a map in determining portion 56 for side impact safing.

Furthermore, types of impacts that actually activate rear impact sensor 20 are identified by impact experiments, and outputs of semiconductor impact sensor 46 corresponding thereto are stored as a map in determining portion 58 for rear impact safing.

The map of each of the determining portions is then compared to an output that semiconductor impact sensor 46 provides when an impact occurs, and safing signal S-SAFING is activated thereby.

Figure 3:
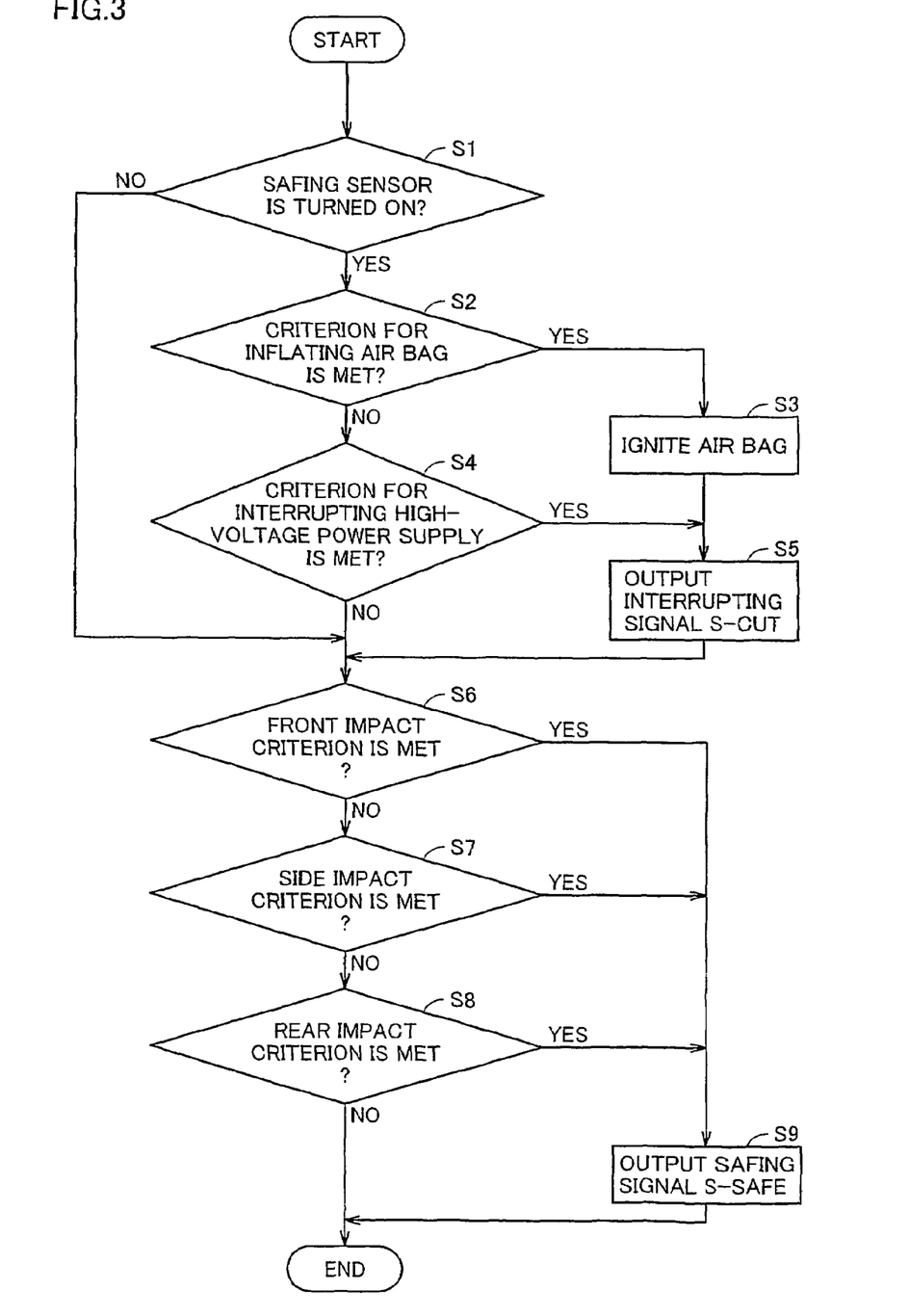
FIG. 3 shows a control flow performed in a control portion 44 of air bag ECU 22 in FIG. 1.

FIG. 3 shows a control flow performed in control portion 44 of air bag ECU 22 in FIG. 1.

Referring to FIG. 3, it is determined in step S1 whether or not safing sensor 48 senses an impact and is made conductive. If safing sensor 48 senses the impact, the process proceeds to step S2. If safing sensor 48 does not sense the impact, the process proceeds to step S6.

In step S2, it is determined whether or not an output of semiconductor impact sensor 46 meets a criterion for inflating an air bag. In step S2, if it is determined that the output of semiconductor impact sensor 46 meets the criterion for inflating the air bag, an instruction to ignite the air bag is provided in step S3, and the process proceeds to step S5.

In step S2, if it is determined that the output of semiconductor impact sensor 46 does not meet the criterion for inflating the air bag, the process proceeds to step S4. In step S4, it is determined whether or not the output of semiconductor impact sensor 46 meets a criterion for interrupting a high-voltage power supply.

In step S4, if it is determined that the output of semiconductor impact sensor 46 meets the criterion for interrupting the high-voltage power supply, the process proceeds to step S5, where interrupting signal S-CUT is output to high-voltage supply control unit 14.

In step S4, if it is determined that the output of semiconductor impact sensor 46 does not meet the criterion for interrupting the high-voltage power supply, the process proceeds to step S6.

In step S6, it is determined whether or not the output of semiconductor impact sensor 46 meets a front impact criterion. In step S6, if the output of semiconductor impact sensor 46 meets the front impact criterion, the process proceeds to step S9. In step S6, if the output of semiconductor impact sensor 46 does not meet the front impact criterion, the process proceeds to step S7.

In step S7, it is determined whether or not the output of semiconductor impact sensor 46 meets a side impact criterion. In step S7, if the output of semiconductor impact sensor 46 meets the side impact criterion, the process proceeds to step S9. In step S7, if the output of semiconductor impact sensor 46 does not meet the side impact criterion, the process proceeds to step S8.

In step S8, it is determined whether or not the output of semiconductor impact sensor 46 meets a rear impact criterion. In step S8, if the output of semiconductor impact sensor 46 meets the rear impact criterion, the process proceeds to step S9. In step S8, if the output of semiconductor impact sensor 46 does not meet the rear impact criterion, the process is completed.

In step S9, safing signal S-SAFING indicating that a certain impact occurs although the air bag does not inflate is output to high-voltage supply control unit 14. When step S9 ends, the process is completed.

A program for performing control as shown in FIG. 3 is stored in ROM 42 in FIG. 1, which is a record medium, and read by control portion 44, which is a computer, for execution.

Figure 4:
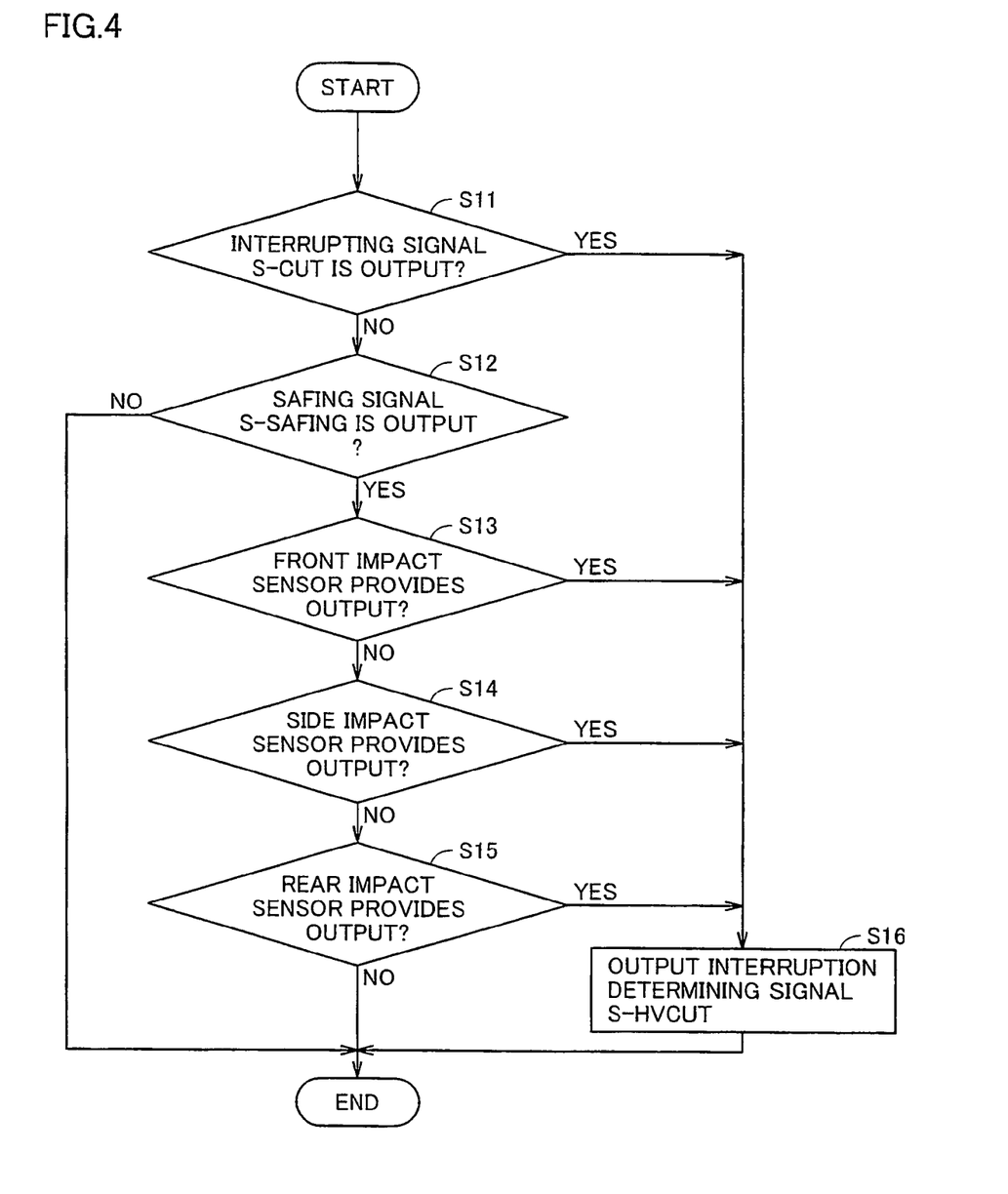
FIG. 4 shows a control flow performed in a control portion 34 of high-voltage supply control unit 14 in FIG. 1.

FIG. 4 shows a control flow performed in control portion 34 of high-voltage supply control unit 14 shown in FIG. 1.

Referring to FIG. 4, when the process starts, it is determined in step S11 whether or not interrupting signal S-CUT is output from air bag ECU 22. If interrupting signal S-CUT is output, the process proceeds to step S16. If interrupting signal S-CUT is not output, the process proceeds to step S12.

In step S12, it is determined whether or not safing signal S-SAFING is output from air bag ECU 22. If safing signal S-SAFING is output, the process proceeds to step S13. If safing signal S-SAFING is not output, the process is completed.

In step S13, it is determined whether or not front impact sensor 16 senses an impact. Note that a result of sensing an impact is held in control portion 34 for 5 seconds after the point of sensing by flagging control portion 34. In step S13, if front impact sensor 16 senses the impact, the process proceeds to step S16. In step S13, if front impact sensor 16 does not sense the impact, the process proceeds to step S14.

In step S14, it is determined whether or not side impact sensor 18 senses the impact. If the impact is sensed, an output of side impact sensor 18 is also held in control portion 34 for 5 seconds after the point of sensing by flagging control portion 34.

In step S14, if side impact sensor 18 senses the impact, the process proceeds to step S16. In step S14, if side impact sensor 18 does not sense the impact, the process proceeds to step S15.

In step S15, it is determined whether or not rear impact sensor 20 senses the impact. An output of rear impact sensor 20 is also held in control portion 34 for 5 seconds after the point of sensing by flagging control portion 34.

In step S15, if rear impact sensor 20 senses the impact, the process proceeds to step S16. In step S15, if rear impact sensor 20 does not sense the impact, the process is completed.

If an output of each of the sensors is sensed in any of steps S11, S13, S14, and S15, interruption determining signal S-HVCUT that determines to interrupt the high-voltage power supply system is output in step S16. When step S16 ends, the process is completed.

A program for performing control as shown in FIG. 4 is stored in ROM 32 in FIG. 1, which is a record medium, and read by control portion 34, which is a computer, for execution.

As described above, firstly, the present embodiment uses an output of the semiconductor impact sensor contained in the air bag ECU to make determination also in light of the criterion for interrupting the high-voltage power supply, which is different from the criterion for inflating the air bag so that the semiconductor impact sensor forms a redundant system along with a conventional safing sensor to prevent malfunction. Therefore, the high-voltage power supply can be interrupted when it is preferable to interrupt the high-voltage power supply and when an air bag is not required to inflate.

Secondly, an output of the semiconductor impact sensor contained in the air bag ECU is used to make determination for safing and output a safing signal thereby so that a redundant system can be formed for front impact sensor 16, side impact sensor 18, and rear impact sensor 20 designed specifically for a hybrid vehicle. Accordingly, malfunction can be prevented when tampering such as a strike with a hammer occurs.

Alternatively, an output of the safing sensor in the air bag ECU may be used as a safing signal for a sensor designed specifically for a hybrid vehicle.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A motor vehicle having an air bag, comprising:
    an air bag ignition device;
    a first control unit for detecting an impact against the vehicle and instructing said air bag ignition device to ignite, wherein said first control unit includes
       a semiconductor impact sensor, and
       a first control portion for outputting a signal for interrupting a high-voltage power supply and a safing signal for interrupting a high-voltage power supply in response to an output of said semiconductor impact sensor;
    a high-voltage power supply;
    an interrupting portion for interrupting an output of said high-voltage power supply; and
    a second control unit for controlling said interrupting portion, wherein said second control unit causes said interrupting portion to immediately interrupt the output of said high-voltage power supply when said signal for interrupting the high-voltage power supply is output, and causes said interrupting portion to interrupt the output of said high-voltage power supply when said safing signal for interrupting the high-voltage power supply is output and when a given criterion is satisfied.

2. The motor vehicle according to claim 1, wherein said first control unit further includes a safing sensor for sensing an impact independently of said semiconductor impact sensor, and said first control portion outputs said signal for interrupting the high-voltage power supply when said safing sensor senses an impact and when the output of said semiconductor impact sensor satisfies a given criterion.

3. The motor vehicle according to claim 1, further comprising an impact sensor for sensing an impact causing a breakage of said high-voltage power supply, independently of said semiconductor impact sensor, wherein said second control unit includes a second control portion for causing said interrupting portion to interrupt the output of said high-voltage power supply when said safing signal for interrupting the high-voltage power supply is output and when said impact sensor senses an impact.

4. The motor vehicle according to claim 3, wherein said first control portion evaluates the output of said semiconductor impact sensor in light of a criterion corresponding to said impact sensor and outputs said safing signal for interrupting the high-voltage power supply.

5. The motor vehicle according to claim 1, wherein said first control unit further includes a safing sensor, said first control portion receives the output of said semiconductor impact sensor and determines whether or not the output meets a first criterion by which the air bag should be inflated, a second criterion by which a circuit related to said high-voltage power supply is assumed to be broken, and a third criterion by which a certain impact is assumed to occur although said first criterion is not satisfied, and said first control portion outputs said signal for interrupting the high-voltage power supply when determining that the output meets said first criterion or said second criterion and when said safing sensor senses an impact, and outputs said safing signal for interrupting the high-voltage power supply when determining that the output meets said third criterion.

6. A motor vehicle having an air bag, comprising:

a high-voltage power supply;

an interrupting portion for interrupting an output of said high-voltage power supply in response to a signal for interrupting the high-voltage power supply;

an air bag ignition device; and a first control unit, wherein said first control unit includes a semiconductor impact sensor for detecting an impact against the vehicle, a safing sensor for sensing an impact independently of said semiconductor impact sensor, and a first control portion for outputting to said air bag ignition device an instruction to ignite when said safing sensor senses an impact and when an output of said semiconductor impact sensor satisfies a given first criterion, and outputting said signal for interrupting the high-voltage power supply when said safing sensor senses an impact and when the output of said semiconductor impact sensor satisfies a given second criterion.

7. A motor vehicle having an air bag, comprising:

a high-voltage power supply;

an interrupting portion for interrupting an output of said high-voltage power supply in response to a signal for determining interruption of the high-voltage power supply;

an air bag ignition device;

a first control unit, wherein said first control unit includes a semiconductor impact sensor for detecting an impact against the vehicle, a safing sensor for sensing an impact independently of said semiconductor impact sensor, and a first control portion for outputting to said air bag ignition device an instruction to ignite when said safing sensor senses an impact and when an output of said semiconductor impact sensor satisfies a given first criterion, and outputting a safing signal when the output of said semiconductor impact sensor satisfies a given second criterion;

an impact sensor for sensing an impact independently of said semiconductor impact sensor; and a second control unit for outputting said signal for determining interruption of the high-voltage power supply when said impact sensor senses an impact and when said safing signal is output.

* * * * *